United States Patent [19]

Asai et al.

[11] Patent Number: 5,527,227
[45] Date of Patent: Jun. 18, 1996

[54] PULLEY

[75] Inventors: Tomohito Asai; Toru Isono; Nobuaki Funahashi, all of Nakashima-gun, Japan

[73] Assignee: Toyoda Gosei Co., Ltd., Japan

[21] Appl. No.: 332,553

[22] Filed: Oct. 31, 1994

[30]    Foreign Application Priority Data

Oct. 29, 1993 [JP] Japan .................................. 5-293985
Oct. 29, 1993 [JP] Japan .................................. 5-293986
Oct. 29, 1993 [JP] Japan .................................. 5-293988

[51] Int. Cl.⁶ .................................................. F16H 55/36
[52] U.S. Cl. .......................................... 474/166; 474/168
[58] Field of Search ............................. 474/166–174

[56]            References Cited

U.S. PATENT DOCUMENTS

| | | |
|---|---|---|
| 4,098,137 | 7/1978 | Yaros . |
| 4,131,032 | 12/1978 | Warland et al. . |
| 4,547,180 | 10/1985 | Hayashi . |
| 4,551,122 | 11/1985 | Kraft et al. ............................ 474/170 |
| 4,799,909 | 1/1989 | Kanemitsu ............................ 474/168 |
| 5,308,289 | 5/1994 | Funahashi . |

FOREIGN PATENT DOCUMENTS

| | | |
|---|---|---|
| 78200187 | 7/1978 | Germany . |
| 7829708 | 3/1979 | Germany . |
| 2800561 | 7/1979 | Germany . |
| 8328893 | 10/1983 | Germany . |
| 3232602 | 3/1984 | Germany . |
| 4322855 | 1/1994 | Germany ............................ 474/170 |
| 4226116 | 2/1994 | Germany . |
| 52-154955 | 6/1976 | Japan . |
| 54122242 | 2/1977 | Japan . |
| 8903950 | 5/1989 | WIPO . |

OTHER PUBLICATIONS

Oshler "Konstruktionen in Blech und in Druckgub", Kirpzig Fau, 1973, pp. 195–196.
Patent Abstract of Japan, vol. 15/No. 225, Jun. 10, 1991.
Patent Abstract of Japan vol. 5/No. 61, Apr. 24, 1981.
Patent Abstract of Japan, vol. 11/No. 388, Dec. 18, 1987

*Primary Examiner*—Michael Powell Buiz
*Attorney, Agent, or Firm*—Cushman Darby & Cushman

[57]            ABSTRACT

A pulley is made from a metal plate which is easy to manufacture, inexpensive in manufacturing cost, light weight and sufficient strength by using a press forming technique. The pulley has a thin tubular boss portion and a disk shaped body portion which are integral. The boss portion may have a reinforcing flange at one open end portion. The reinforcing flange aids in providing sufficient strength against the tightening force of a nut which is screwed onto a shaft inserted into the boss portion, and also disperses the tightening force. Further, the pulley may have formed integrally on the boss portion a key member.

10 Claims, 11 Drawing Sheets

1
PULLEY

BACKGROUND OF THE INVENTION

The priority applications Ser. Nos. 5-293985, 5-293986 and 5-293988, all filed Oct. 29, 1993 in Japan are incorporated herein by reference.

Field of the Invention

The present invention relates to a pulley, and more particularly to a pulley which has at least a boss portion and a disk shaped body portion integrally formed. The pulley is made from a metal plate so as to be easy to manufacture, inexpensive in manufacturing cost, light weight and to have sufficient strength.

Description of Related Art

Recently, there has been a demand for a pulley which is light in weight and its manufacturing costs reduced. Then, efforts were made to make pulleys from a light weight metal plate by using a press forming technique instead of a conventional thick pulley, which is wholly made by casting.

Figure 1:
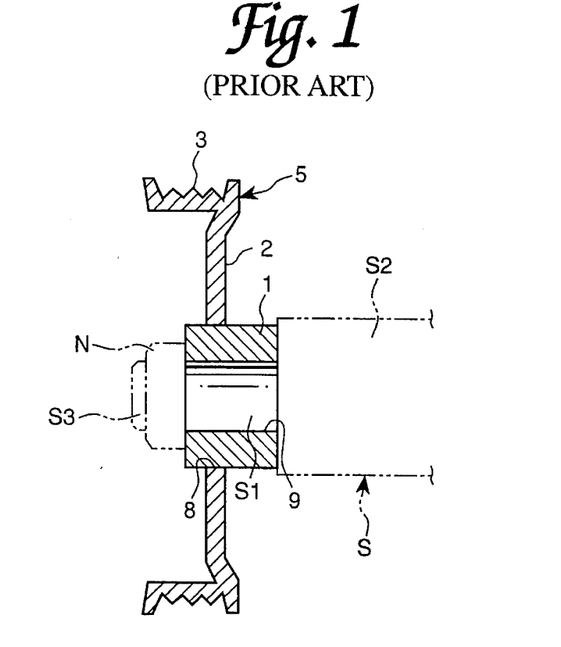
FIG.1 is a vertical cross-sectional view of a conventional pulley.

For example, such a metal plate pulley is shown in FIG. 1 and a similar one in U.S. Pat. No. 4,098,137.

As shown in FIG. 1, the pulley 5 has a disk portion 2, a belt mounting portion 3 which is perpendicularly extending with some predetermined length from the outer peripheral edge of the disk portion 2, and a boss 1 which is located at the center of the disk portion 2.

The disk portion 2 and belt mounting portion 3 are integrally formed from one metal plate by press forming. The boss 1 is a thick metal tube made by casting or forging. The boss 1 is inserted into an opening 8 of the disk portion 2, and they are connected with each other by welding. Then, the pulley 5 is finished.

The pulley 5 is mounted on an end portion of a rotary shaft S. The shaft S has an end screw portion S3, a small diameter portion S1 and a large diameter portion S2. Namely, the end screw portion S3 and small diameter portion S1 insert into a center hole 9 of the boss 1, and the end screw portion S3 protrudes from the boss 1. Then, a nut N screws on the end screw portion S3. Therefore, the boss 1 is clamped between the nut N and an end face or shoulder of the large diameter portion S2. Consequently, the pulley 5 is fixed on the rotary shaft S rotatably with the shaft S.

The reasons for using, a thick metal tube boss 1 is to obtain sufficient strength in the boss to prevent its deformation when the nut N is tightened against the boss and to disperse the contact force. The contact force is generated between the end face of the boss 1 and the end face of the large diameter portion S2 by the tightening of nut N. The dispersion of the contact force is attained by increasing the contact surface between the end face of the large diameter portion S2 and the end face of the boss 1.

However, three different manufacturing lines are needed to produce the pulley 5. One is for the boss 1 made by casting or forging, another is for portions 2 and 3 made from one metal plate by press forming, and the third is for connecting boss 1 and disk portion 2 by welding. Therefore, the pulley 5 needs many manufacturing steps and is expensive to manufacture. Further, the pulley 5 may have a fault according to the integrity of the welding between disk portion 2 and boss 1. The V-belt pulley in Japanese Kokai 52-154955 could also have the same problem.

Also, because pulley 5 has a thick metal tube boss 1, it is difficult to reduce its large volume and weight.

Figure 2:
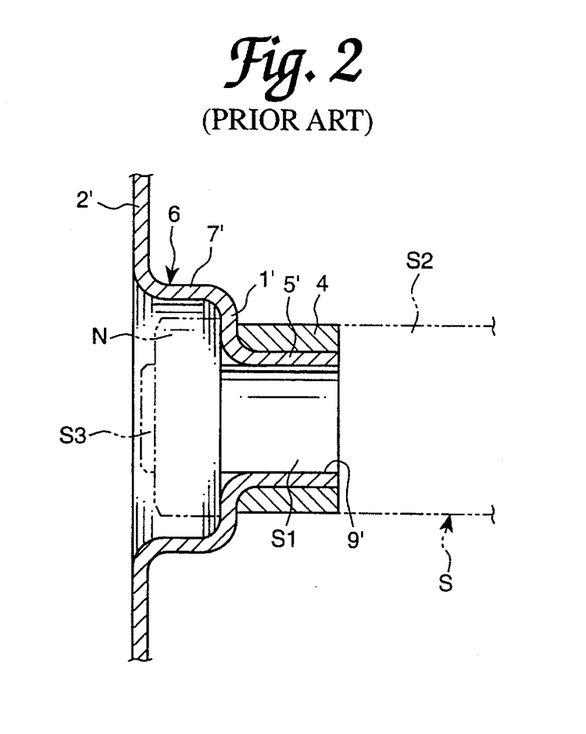
FIG.2 is an enlarged, partial cross-sectional view of a boss portion of another conventional pulley.

Therefore, another pulley, which is shown in FIG. 2, has been tried. This pulley 6 has a disk portion 2', a belt mounting portion (not shown in FIG. 2) which is perpendicularly extending for some predetermined length from the outer peripheral edge of the disk portion 2' and a thin cylindrical boss portion 1'. The boss portion 1' is located at the center of the disk portion 2'. The boss portion 1' is integrally formed from a metal plate with portions 2' and the belt mounting portion by press forming. (A similar pulley is disclosed in Japanese Utility Model Laid-open publication No. Sho 54-122242.) The boss portion 1' has a large diameter part 7' and a small diameter part 5'.

The pulley 6 is also mounted on an end portion of the rotary shaft S which is the same shaft S in FIG. 1. Namely, the end screw portion S3 and the small diameter portion S1 insert into a center hole 9' of the boss portion 1'. The small diameter portion S1 is located at the small diameter part 5' and the end screw portion S3 is located at the large diameter part 7'. Then, a reinforcing ring 4 is provided on the outer surface of the small diameter part 5' of the boss portion 1' for clamping the part 5' to the small diameter portion S1. The reinforcing ring 4 helps to increase the contact surface between an end face of the boss portion 1' and an end face or shoulder of the large diameter portion S2. The reinforcing ring 4 also helps to prevent deformation of the small diameter part 5', for example an expanding deformation of the open end portion of part 5', when part 5' is subjected to the force developed during the tightening of nut N.

Then, the nut N screws on the end screw portion S3. Therefore, part 5' of the boss portion 1' and the reinforcing ring 4 are clamped between the nut N and the end face or shoulder of the large diameter portion S2. Consequently, the pulley 6 is mounted on the shaft S.

In this case, the pulley 6 has attained light weight without welding problems. However, the reinforcing ring 4 requires another manufacturing line to make it, and an assembly operation is needed to attach it to the boss portion 1'. Therefore, there are still too many manufacturing steps and not enough reduction in cost.

When an exact position between the pulley and the rotary shaft, and/or an exact transmitting rotary force for the rotary direction are required, the pulley generally connects to the shaft by using key members.

Figure 3:
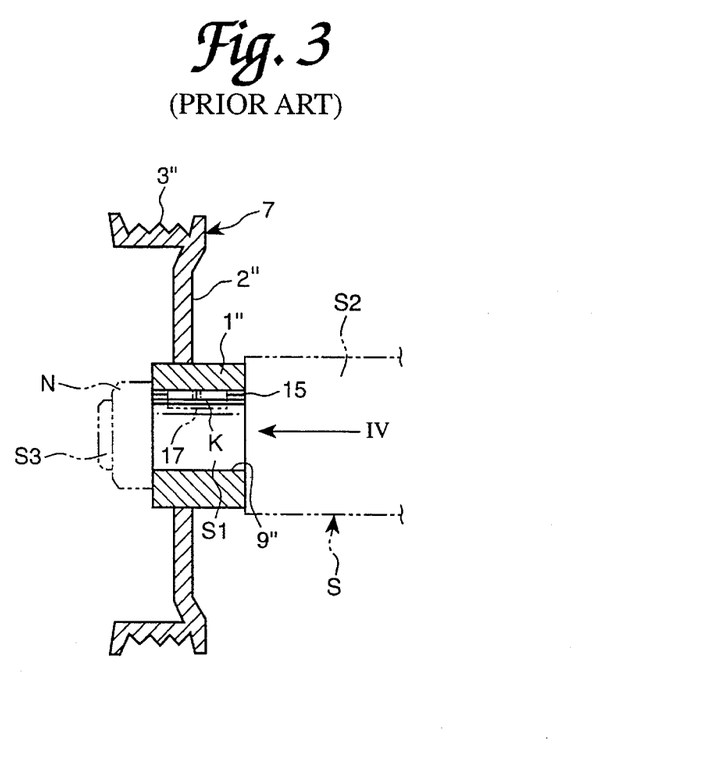
FIG.3 is a vertical cross-sectional view of yet another conventional pulley.
Figure 4:
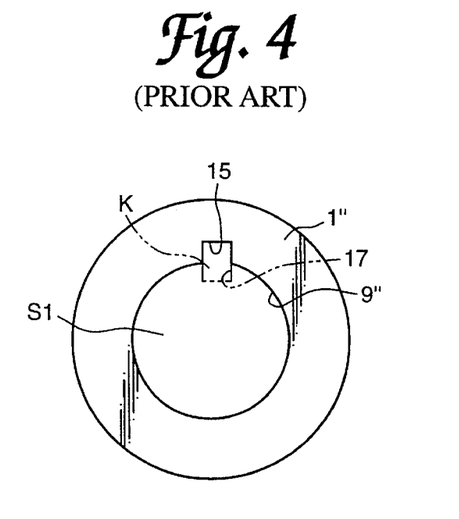
FIG.4 is an enlarged, principal front elevational view of a boss of the pulley in FIG. 3, looking in the direction of arrow IV in FIG. 3.

As shown in FIGS. 3 and 4, pulley 7 and rotary shaft S have almost the same structure as in FIG. 1. A boss 1" has a key groove 15, as one of the key members, on an inner surface of a center hole 9' by cutting forming. The key groove 15 is rectangular shape in cross-section. Also, the small diameter portion S1 of the rotary shaft S has a groove 17. A key K, as one of the key members, is fixed in the groove 17 for protruding from the outer surface of the small diameter portion S1. The key K is also rectangular shape in cross-section.

According to the installation of the pulley 7, the shaft S inserts into the center hole 9" of the boss 1". At this time, the key K also inserts in the key groove 15. Consequently, the pulley 7 is fixed on the shaft S exactly.

Remaining structures and connecting functions are the same according to the above description of FIG. 1.

However, in this case, the pulley 7 has the above mentioned problems such as a heavy weight problem, an expensive manufacturing cost problem, and a welding problem. Further, the pulley 7 needs to have the cutting forming process for the key groove 15. Therefore, manufacturing steps and manufacturing cost increase.

SUMMARY OF THE INVENTION

The present invention overcomes the conventional pulley problems described above.

An object of the present invention is to provide a pulley made from a metal plate with easy manufacturing, inexpensive manufacturing cost, light weight, sufficient strength and without welding problems.

Another object of the present invention is to provide a pulley which has sufficient strength to withstand the force developed by the tightening of the shaft nut and which disperses the contact force generated by the tightening of the shaft nut.

Yet another object of the present invention is to provide a pulley, which is made from a metal plate with one of the key members integral, for obtaining easy manufacturing, light weight and inexpensive manufacturing cost.

In accordance with the invention, these objects are achieved by a pulley made from a metal plate. The pulley has at least a thin tubular boss portion and a disk shaped body portion. The boss portion preferably has a reinforcing flange at its open end portion.

Other objects, features, and characteristics of the present invention, as well as the methods and operation and functions of the related elements of the structure, will become apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENTS

Preferred exemplary embodiments of the present invention will now be described in reference to the accompanying drawings.

Figure 5:
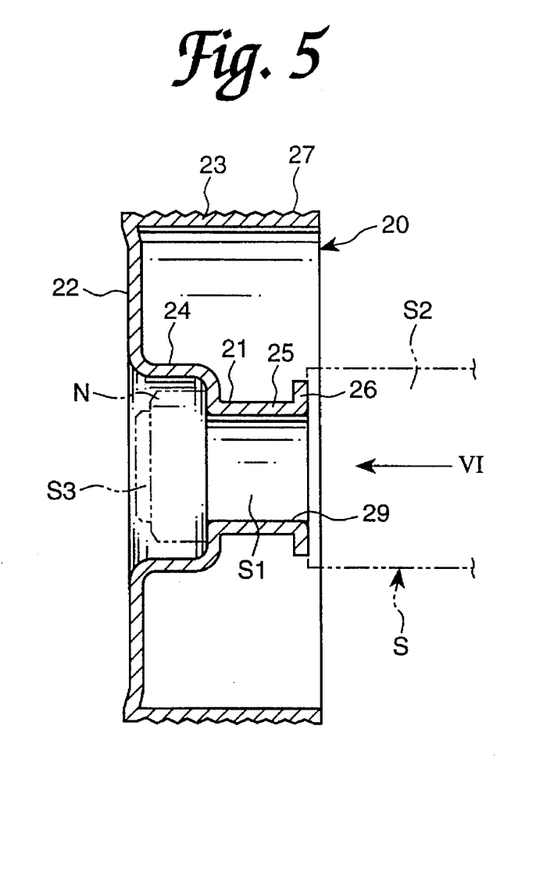
FIG.5 is a vertical cross-sectional view showing a pulley of the first embodiment of the present invention.
Figure 6:
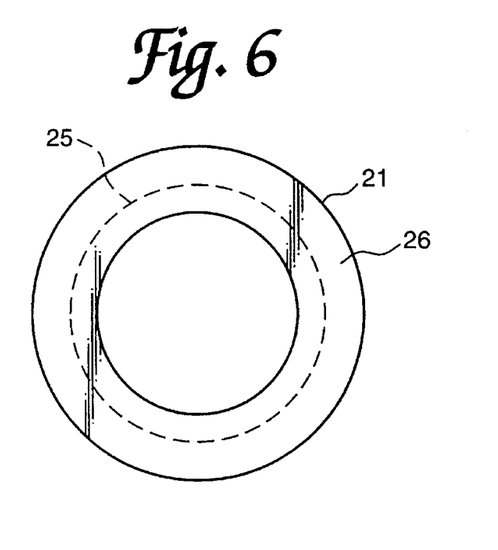
FIG.6 is an enlarged, principal front elevational view of a boss portion of the pulley in FIG. 5, looking in the direction of arrow VI in FIG. 5.

First embodiment: FIGS. 5 and 6

As shown in FIGS. 5 and 6, a pulley 20 includes a thin cylindrical boss portion 21 which is located at the center of the pulley 20, a disk shaped body portion 22 which extends from the boss portion 21, and a cylindrical belt mounting portion 23 which is located on the outer end part of body portion 22 and overlays the boss portion 21 concentrically. These three portions 21, 22 and 23 are integrally formed from a relative thin metal plate member, for example, thickness t=2.8 mm, made of hot or cold rolled carbon steel plate, by using a press forming technique.

The boss portion 21 also has a large diameter part 24, a small diameter part 25 and a reinforcing flange 26. The flange 26 is formed from circumferentially around the open end portion of the small diameter part 25 to bend perpendicularly outwardly by using a press forming technique, and the flange 26 is simultaneously formed with the boss portion 21 when the press forming is carried out.

The disk shaped body portion 22 perpendicularly extends from a circumferential edge of one end of the large diameter part 24 of the boss portion 21, so the body portion 22 integrally connects with the boss portion 21 and the belt mounting portion 23.

The belt mounting portion 23 perpendicularly extends from the outer circumferential edge of the body portion 22. Also, the belt mounting portion 23 has a plurality of belt mounting grooves 27, which are formed by spin forming, on the outer surface.

The pulley 20 is mounted on an end portion of the rotary shaft S which is the same as the conventional rotary shaft S. Namely, the end screw portion S3 and the small diameter portion S1 insert into a center hole 29 of the boss portion 21. The small diameter portion S1 is located at the small diameter part 25 and the end screw portion S3 is located at the large diameter part 24. Then, a shaft nut N screws on the end screw portion S3. Therefore, the boss portion 21 is clamped between the nut N and an end face or shoulder of the large diameter portion S2 of the shaft S.

At that time, a contact surface between the open end face of the boss-portion 21 and the end face or shoulder of the large diameter portion S2 receives a contact force by the tightening of nut N. However, as the reinforcing flange 26 is formed at the open end portion of the boss portion 21, the contact force disperses to the whole end face of the flange 26. Therefore, the existence of the flange 26 prevents problems, such as deformation of the boss portion according to the concentration of the contact force at the small area. Also, the existence of the flange 26 makes the open end portion of the boss portion 21 stronger. Consequently, no deformation occurs in the small diameter part 25, in particular no expanding deformation of the open end portion of part 25 of the boss portion 21 occurs, due to the force developed by the tightening of nut N.

In accordance with the first embodiment, the pulley 20 is made from a thin metal plate member by press forming. Therefore, the pulley 20 is light weight. As the pulley 20 is only made by press forming, it can be easily made and the manufacturing cost is inexpensive. Further, as the reinforcing flange 26 is formed at the open end portion of the boss portion 21, the pulley 20 has a sufficient strength against the force developed by the tightening of nut N. Then, the flange 26 can let the contact force disperse to the whole end face of the flange. Also, as the flange 26 is formed on the open end portion of the boss portion 21 integrally, the pulley 20 does not need to use the conventional reinforcing ring 4 in FIG. 3.

Figure 7:
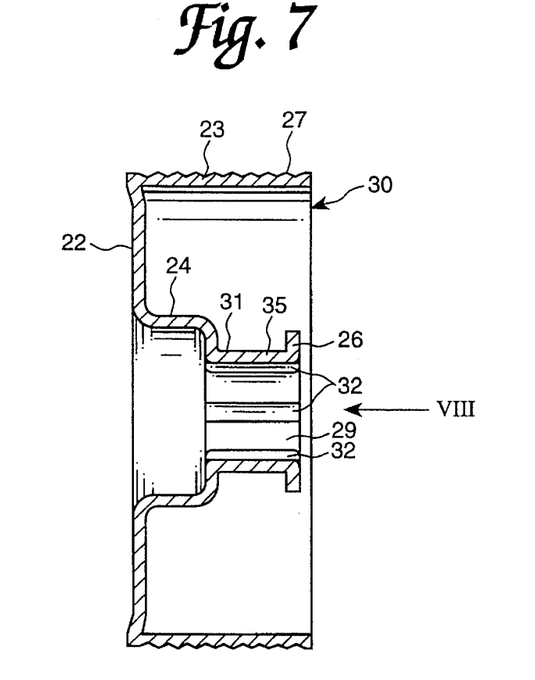
FIG.7 is a vertical cross-sectional view showing a pulley of the second embodiment of the present invention.
Figure 8:
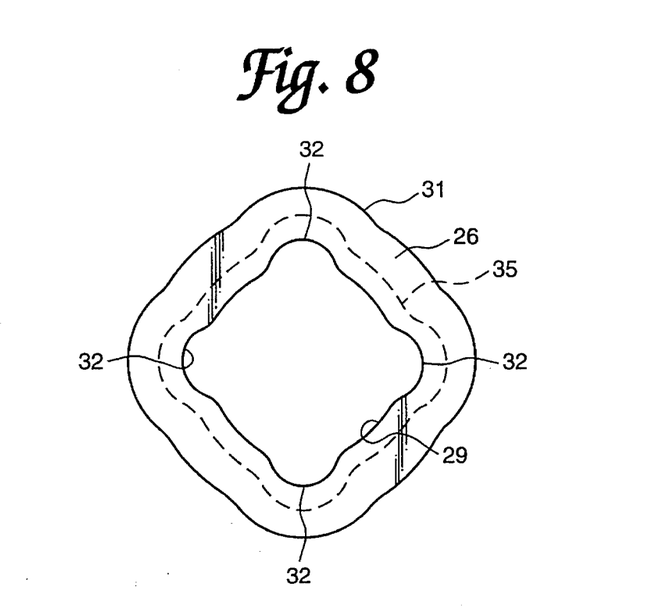
FIG.8 is an enlarged, principal front elevational view of a boss portion of the pulley in FIG. 7, looking in the direction of arrow VIII in FIG. 7.

Second embodiment: FIGS. 7 and 8

In FIGS. 7 and 8, a pulley 30 of the second embodiment has four reinforcing ribs 32 on a small diameter part 35 of a boss portion 31 to increase the strength of the small diameter part 35. The remaining structure of the pulley 30 of the second embodiment is the same as the pulley 20 in the first embodiment, except that the boss portion 31, etc, are square as shown in FIG. 8 instead of round as shown in FIG. 6.

The reinforcing ribs 32 protrude outwardly and arcuately from a circumferential wall of the small diameter part 35 at four equally spaced locations as shown in FIG. 8. Since ribs 32 help to increase the strength of the small diameter part 35, the boss portion 31 does not deform easily when nut N is tightened even a little more. Consequently, the boss portion 31 has sufficient strength against the tightening force.

Also, the same function and result are obtained in the second embodiment as in the first embodiment.

Figure 9:
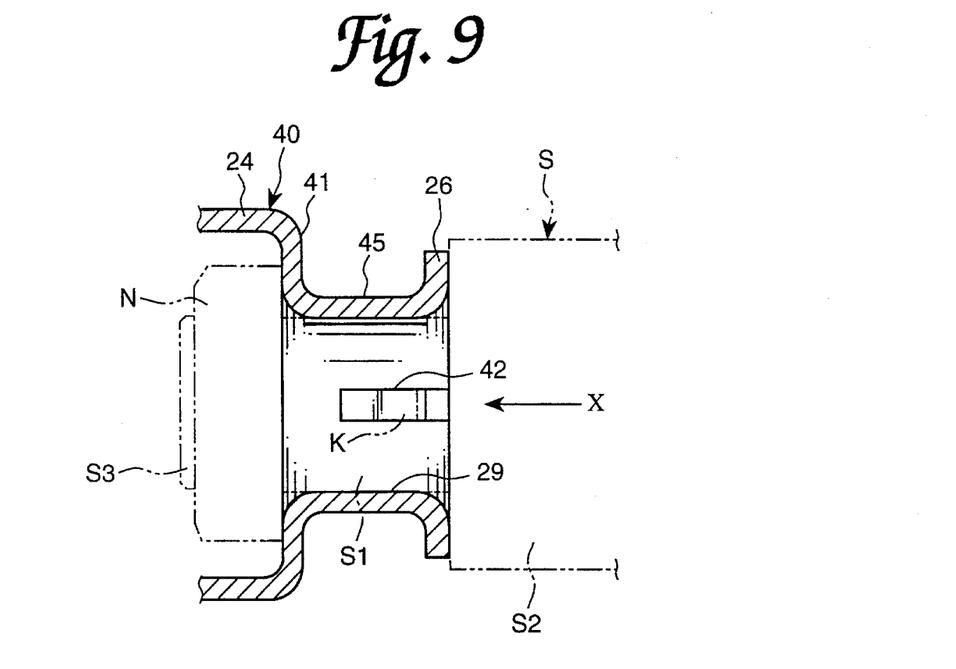
FIG.9 is an enlarged, partial cross-sectional view of a boss portion of a pulley of the third embodiment of the present invention.
Figure 10:
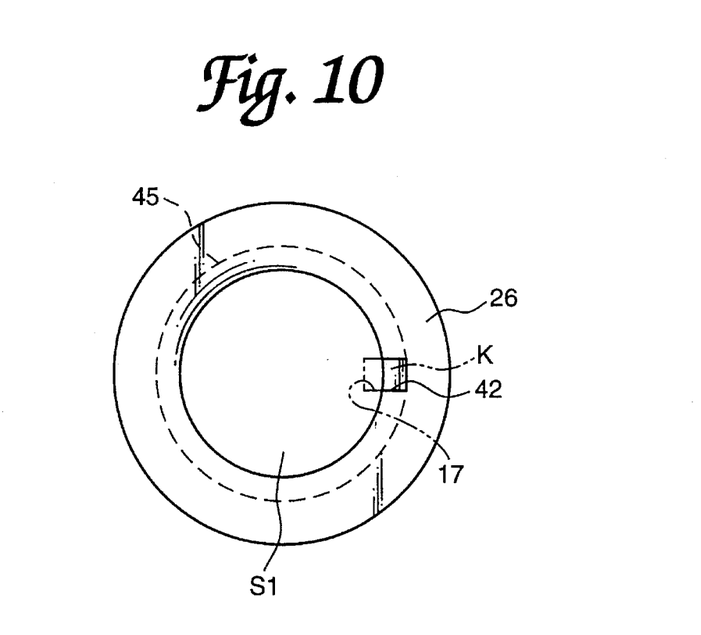
FIG.10 is an enlarged, principal front elevational view of the boss portion of the pulley in FIG. 9, looking in the direction of arrow X in FIG. 9.

Third embodiment: FIGS. 9 and 10

In FIGS. 9 and 10, a pulley 40 of the third embodiment has a key groove 42 on a small diameter part 45 of a boss portion 41. The remaining structure of the pulley 40 of the third embodiment is the same as the pulley 20 in the first embodiment.

The key groove 42 as one of the key members is made on a circumferential wall of the small diameter part 45 of the boss portion 41 by press forming to cut off the wall. The key groove 42 extends toward an open edge of the small diameter part 45, but it does not extend to the reinforcing flange 46. (See FIG. 10) The key groove 42 is of rectangular shape in front view. However, it should be understood that the shape of the key groove can have a variety of shapes, which has parallel side edges, including, for example, a semicircular shape at the one end portion.

On the other hand, a key K as one of the key members mounts on the small diameter portion S1 of the rotary shaft S in groove 17.

Also, the width of the key groove 42 is made the same width of the key K. The height of the key K, which protrudes from the outer surface of the small diameter portion S1, is almost the same or less than the depth of the key groove 42.

The pulley 40 is mounted on the end portion of the rotary shaft S. Namely, the end screw portion S3 and the small diameter portion S1 of the shaft S insert into a center hole 29 of the boss portion 41. The small diameter portion S1 is located at the small diameter part 45 and the end screw portion S3 is located at the large diameter part 24. At that time, the key K inserts in the key groove 42. Therefore, the pulley 40 is positioned on the shaft S exactly. Then, nut N is screwed on the end screw portion S3. Consequently, the boss portion 41 is clamped between the nut N and an end face or shoulder of the large diameter portion S2 of the shaft S.

Therefore, the same function and result are obtained in the third embodiment as in the first embodiment. Further, the pulley 40 of the third embodiment is exact in its positioning and exactly transmits the rotary force to the rotary direction. Also, as the pulley 40 is made from a thin metal plate with the key groove 42 integrally by press forming, it is easily manufactured, light weight, inexpensive in manufacturing cost and without welding problems.

According to the above key connection in the third embodiment, it can be used in modified pulleys as shown in FIGS. 11 to 14.

Figure 11:
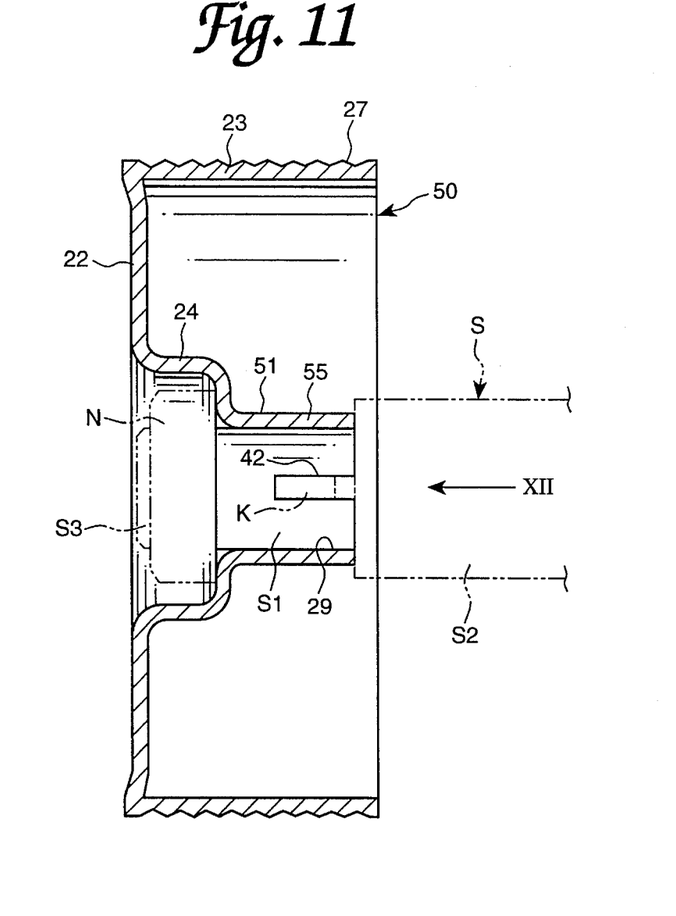
FIG.11 is a vertical cross-sectional view showing a modified pulley.
Figure 12:
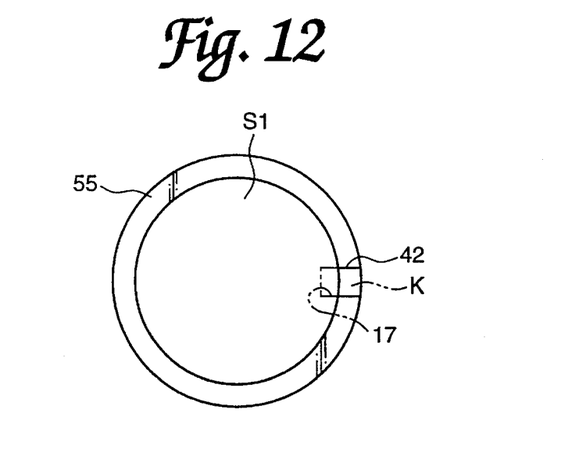
FIG.12 is an enlarged, principal front elevational view of a boss portion of the pulley in FIG. 11, looking in the direction of arrow XII in FIG. 11.

In FIGS. 11 and 12, pulley 50 is a modified version of pulley 40 in FIG. 9 in that it does not have flange 26. Consequently, the S2 portion of shaft S does not need to have as large a diameter as in FIG. 9, and the end face of the small diameter part 55 itself abuts the shoulder of the S2 portion. Otherwise, everything else is the same with it being understood that the boss portion 51 is clamped between the nut N and an end face or shoulder of the S2 portion S2.

Therefore, the same function and result are obtained in this modified pulley 50 as in the third embodiment.

Figure 13:
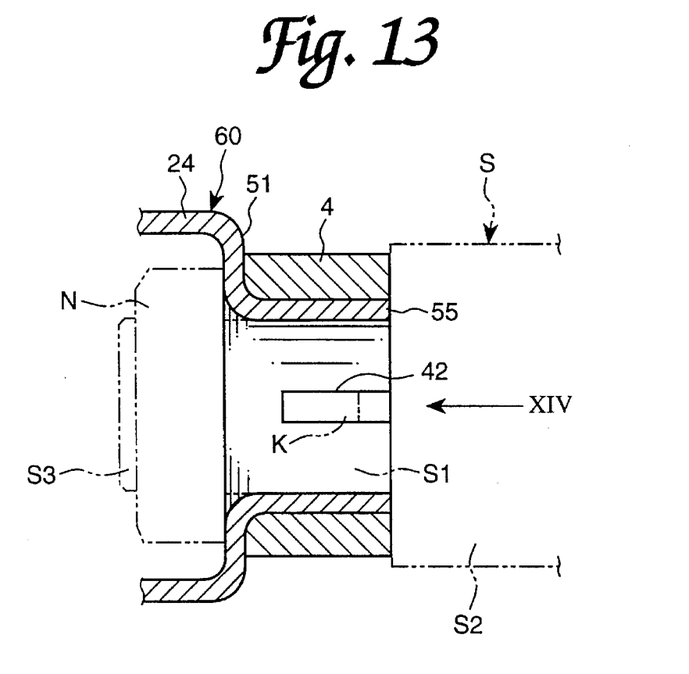
FIG.13 is an enlarged, partial cross-sectional view of a boss portion of another modified pulley.
Figure 14:
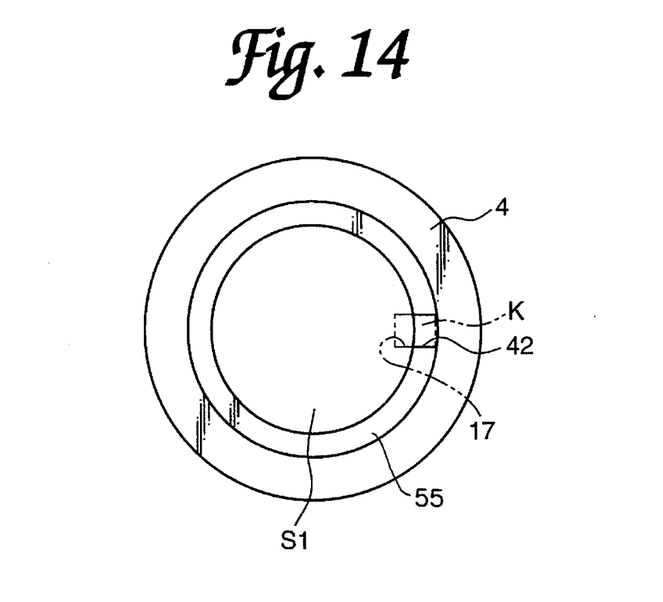
FIG.14 is an enlarged, principal front elevational view of the boss portion of the pulley in FIG. 13, looking in the direction of arrow XIV in FIG. 13.

In FIGS. 13 and 14, pulley 60 is a modified version of the FIG. 11 pulley 50 with the only changes being the addition of ring 4 and an enlarged S2 shaft portion. Reinforcing ring 4 is provided on the outer surface of the small diameter part 55. Consequently, the boss portion 51 and the reinforcing ring 4 are clamped between the nut N and an end face or shoulder of the large diameter portion S2 of the shaft S.

Therefore, the same function and result are obtained in this modified pulley 60 as in the third embodiment.

Figure 15:
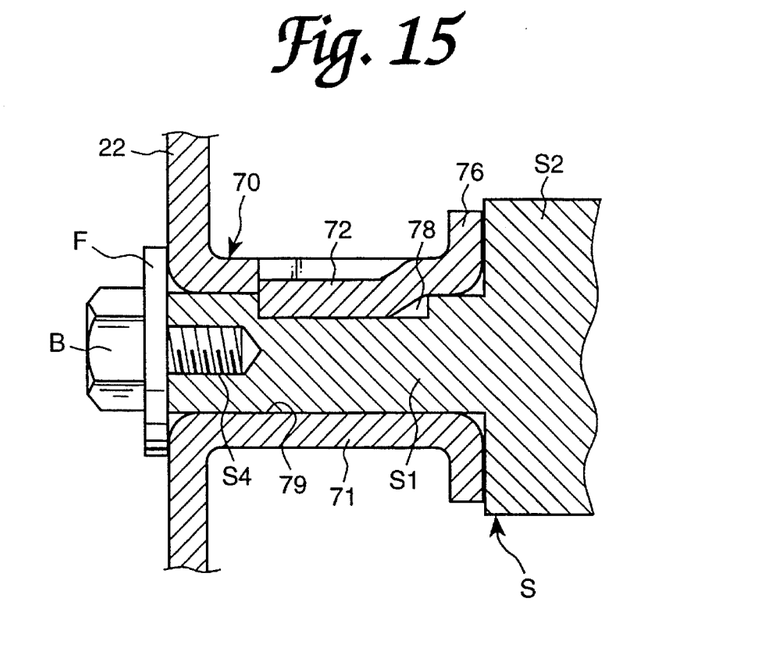
FIG. 15 is an enlarged, partial cross-sectional view showing a boss portion of a pulley of the fourth embodiment of the present invention.
Figure 16:
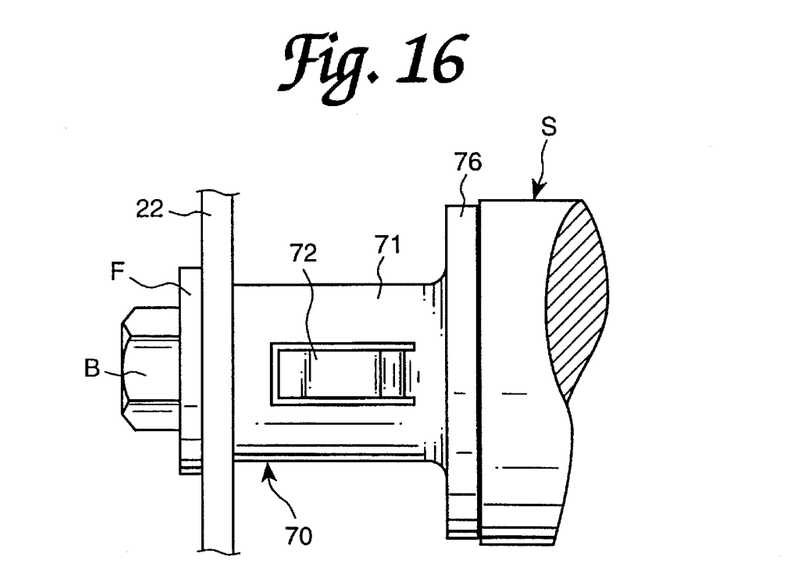
FIG.16 is an enlarged, principal side view showing the boss portion of the pulley in FIG. 15.

Fourth embodiment: FIGS. 15 and 16

In FIGS. 15 and 16, a pulley 70 of the fourth embodiment has a key part 72 on a boss portion 71. The pulley 70 has a thin cylindrical boss portion 71 which is located at the center of the pulley 70, a disk shaped body portion 22, and the cylindrical belt mounting portion is not shown in FIGS. 15 and 16 though it is the same as in FIG. 11. These three portions are integrally made from a thin metal plate by using a press forming technique. The boss portion 71 also has a reinforcing flange 76 and the key part 72.

The flange 76 is formed from around the circumferential open end portion of the boss portion 71 to bend perpendicularly outwardly by using a press forming technique. The flange 76 is the same as flange 26 in the above first to third embodiments.

The key part 72, as one of the key members, is formed as a tongue from the circumferential wall of the boss portion 71. Namely, a C-shape slot is cut in the wall in a longitudinal or axial direction as shown in FIG.16 and the key part 72 is bent to protrude inwardly as shown in FIG. 15.

The key part 72 and the flange 76 are almost simultaneously made with the boss portion 71 when the press forming technique is carried out, i, e., in one press forming stroke for example.

On the other hand, a key groove 78, as one of the key members, is provided on the small diameter portion S1 of rotary shaft S. The width of the key groove 78 is made the same width as the key part 72. Also, shaft S has a large diameter portion S2 and a female screw portion S4, which is located in the center of the small diameter portion S1. Then, the screw portion S4 extends from the end face of the shaft S in the longitudinal direction, and it is open at the end face.

The pulley 70 is mounted on an end portion of the shaft S. The small diameter portion S1 is inserted into a center hole 79 of the boss portion 71. The end face of portion S1 pushes the key part 72 radially outwardly and the key part 72 rides along the outer surface of the small diameter portion S1 until it reaches key groove 78 at which time it snaps into the key groove 78 by the resilient character of the key part 72. Then, an end face of the key part 72 comes into contact with one end wall of the key groove 78. Also, both side faces of the key part 72 come into contact with both side walls of the key groove 78. Therefore, the key part 72 is exactly located in the key groove 78. Then, a bolt B with flange F screws in the female screw portion S4. Consequently, the boss portion 71 is clamped between the flange F and an end face or shoulder of the large diameter portion S2 of the shaft S.

Therefore, the same function and result are obtained in the fourth embodiment as in the third embodiment. Further, as the key part 72 is formed on the boss portion 71 integrally, the pulley 70 does not need to use the conventional separated key K in FIGS. 3 and 4. Further, if bolt B comes loose and falls off from the shaft S, since the end face of the key part 72 comes into contact with the end wall of the key groove 78, the pulley 70 can not come off the shaft S easily.

Figure 17:
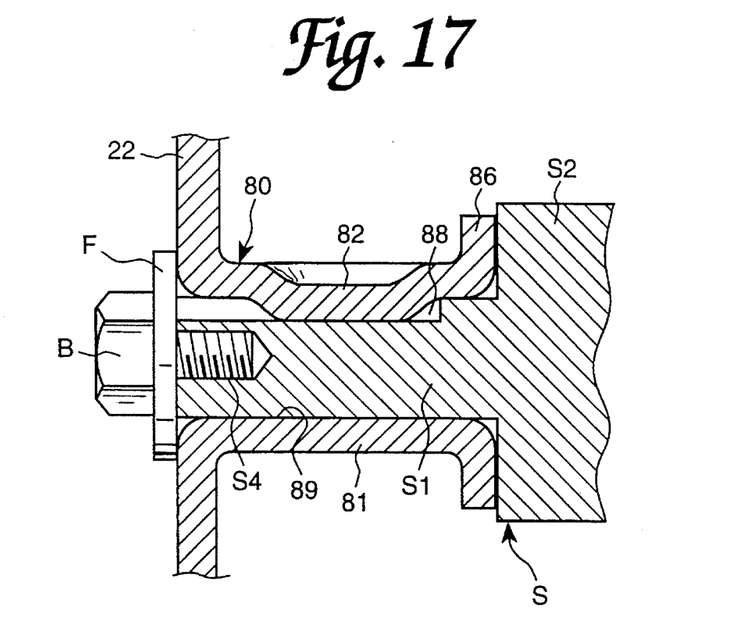
FIG.17 is an enlarged, partial cross-sectional view showing a boss portion of a pulley of the fifth embodiment of the present invention.
Figure 18:
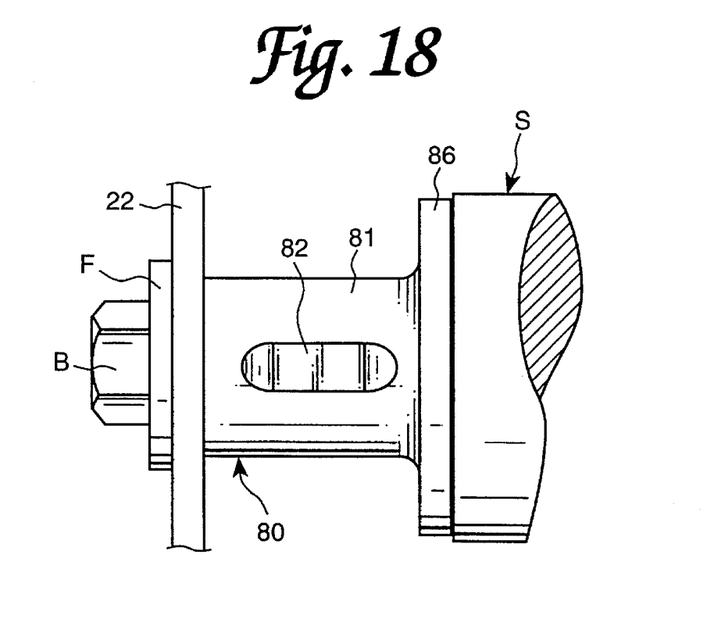
FIG.18 is an enlarged, principal side view showing the boss portion of the pulley in FIG. 17.

Fifth embodiment: FIGS. 17 and 18

In FIGS. 17 and 18, a pulley 80 of the fifth embodiment has a key part 82 which is an uncut part of the cylindrical boss portion 81 which is located at the center of the pulley 80. The pulley 80 also has a disk shaped body portion 22 and the cylindrical belt mounting portion which is not shown in FIGS. 17 and 18 though it is the same as mounting portion 23 in FIG. 11. These three portions are integrally made from a thin metal plate by using a press forming technique. The boss portion 81 also has a reinforcing flange 86.

The flange 86 is formed around the circumferential open end portion of the boss portion 81 to bend perpendicularly outwardly by using a press forming technique. The flange 86 is the same as the flange in the above first to fourth embodiments.

The key part 82, as one of the key members, is formed as a dimple in the circumferential wall of the boss portion 81. The key part 82 has parallel side faces extending in a longitudinal direction and rounded ends as shown in FIG. 18, forming a generally oval shaped key part 82. To form the key part 82, as part of the boss portion 81 is bent by press forming so as to protrude inwardly. That finishes the key part 82. It should be understood that the shape of the key part 82 can have a variety of shapes, for example, circular, or other shapes, which have the same width as a key groove of rotary shaft S and the key part is able to be inserted into the key groove.

The key part 82 and the flange 86 are almost simultaneously made with the boss portion 81 when the press forming technique is carried out, i, e., in one press forming stroke for example.

On the other hand, a key groove 88, as one of the key members, is provided on the small diameter portion S1 of the shaft S. The width of the key groove 88 is made the same as the width of the key part 82. In this case, the key groove 88 not only has the same width as key part 82 but also extends to the end face of shaft S in the longitudinal direction. Therefore, key part 82 does not have to bend outwardly when shaft S1 portion is inserted. Besides the small diameter portion S1, shaft S has a large diameter portion S2 and a female screw portion S4 which is located in the center of the small diameter portion The screw portion S4 extends from the end face of the shaft S in the longitudinal direction, and it is open at the end face.

The pulley 80 is mounted on an end portion of the shaft S. Namely, the small diameter portion S1 inserts into a center hole 89 of the boss portion 81. At this time, the key part 82 inserts into the key groove 88. Then, both side faces of the key part 82 come into contact with both side walls of the key groove 88. Therefore, the key part 82 is exactly located in the key groove 88. Then, a bolt B with flange F screws in the female screw portion S4. Consequently, the boss portion 81 is clamped between the flange F and an end face or shoulder of the large diameter portion S2 of the shaft S easily.

Therefore, the same function and result are obtained in the fifth embodiment as in the fourth embodiment. Further, key part 82 of the fifth embodiment can be stronger than the key part 72 of the fourth embodiment.

According to the above key connections in the fourth and fifth embodiments, it can be used in modified pulleys as in FIGS. 19 to 22.

Figure 19:
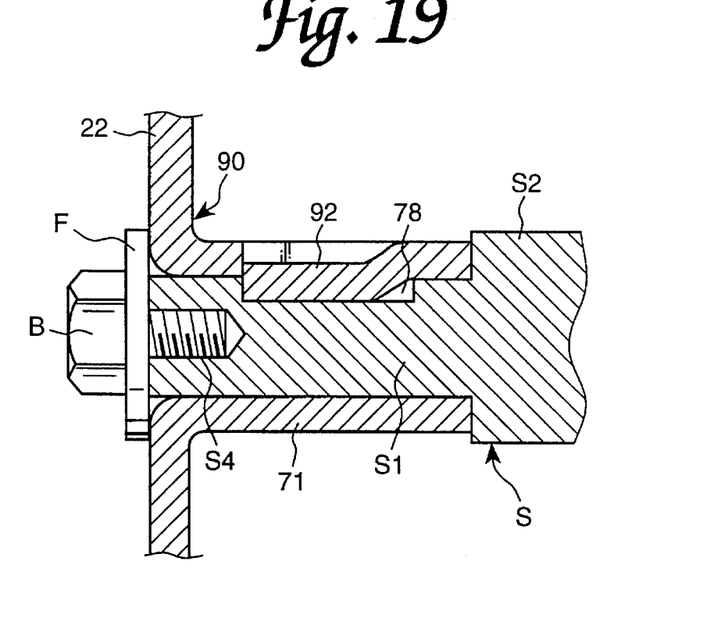
FIG.19 is an enlarged, partial cross-sectional view showing a boss portion of a modified FIG. 15 type pulley.
Figure 20:
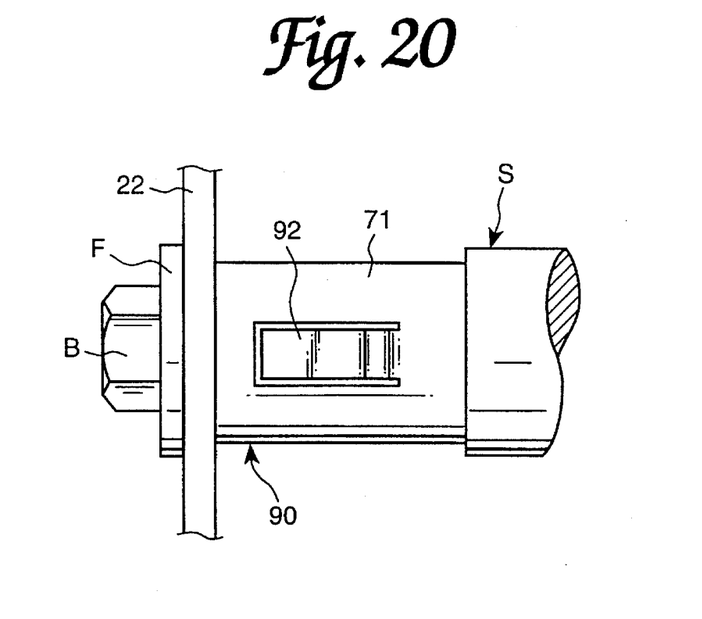
FIG. 20 is an enlarged, principal side view showing the boss portion of the pulley in FIG. 19.

In FIGS. 19 and 20, pulley 90 is a modification of the pulley 70 in FIGS. 15 and 16 in that it has key part 92 and has no flange 76. Consequently, the S2 portion of the shaft S does not need to have as large a diameter. Otherwise, everything is the same with it being understood that the boss portion 71 is clamped between the flange F and an end face of the large diameter portion S2 of the shaft S.

Figure 21:
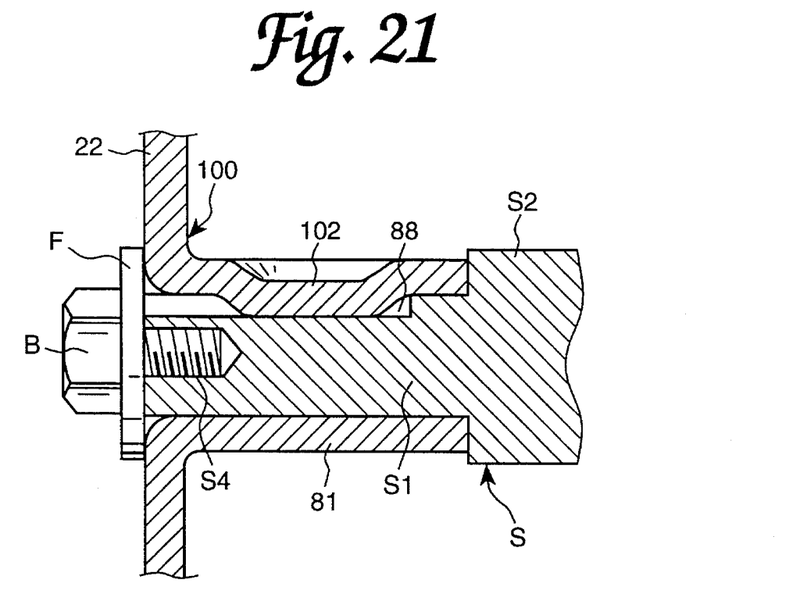
FIG.21 is an enlarged, partial cross-sectional view showing a boss portion of a modified FIG. 17 type pulley.
Figure 22:
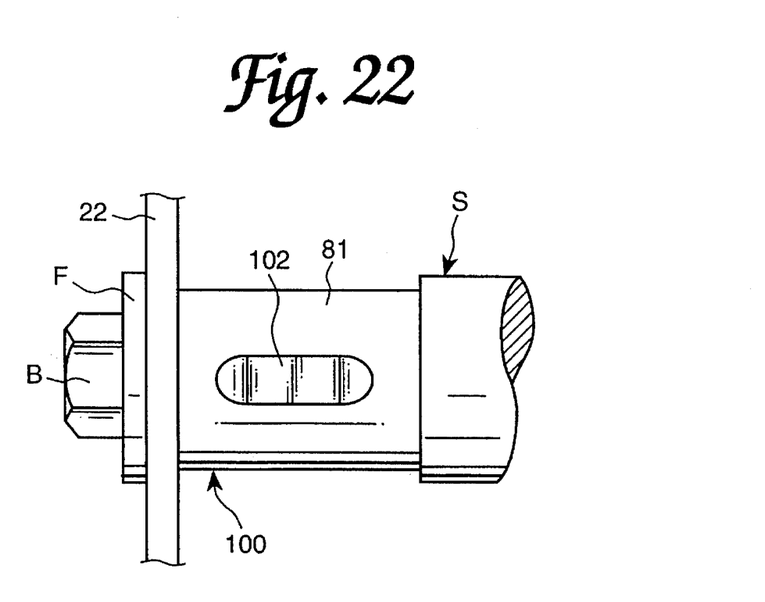
FIG.22 is an enlarged, principal side view showing the boss portion of the pulley in FIG. 21.

In FIGS. 21 and 22, pulley 100 is a modification of the pulley 80 in FIGS. 17 and 18 in that it has key part 102 and has no flange 86. Consequently, the S2 portion of shaft S does not need to have as large a diameter and the end face of boss portion 81 itself abuts the shoulder of the S2 portion. Otherwise, everything is the same as in FIGS. 17 and 18 with it being understood that boss portion 81 is clamped between the flange F and an end face or shoulder of the large diameter portion S2 of the shaft S.

Therefore, the same function and result are obtained in this modified pulley 100 as in the fifth embodiment.

In all of the above embodiments and modifications, the thickness of the described thin metal plate may be as desired, but is, for example, 2.8 mm, which aids in providing the desired light weight pulley and in allowing forming by a press forming technique. Also, it should be noted that any of the embodiments and modifications can have any of the disclosed types of key members or reinforcing ribs 32, or both.

According to the above first to fifth embodiments, the pulleys 20, 30, 40, 70 and 80 are shown and described as a structure in which the body portion and belt mounting portion are integrally formed. However, if the pulley is a torsional damper pulley, the body portion of the pulley may connect to the belt mounting portion through a rubber layer which is an attached mass member, or may connect to a combined belt mounting portion with a mass member through a rubber layer. In this case, at least the boss portion and the pulley's body portion are integrally formed from a thin metal plate by using a press forming technique. Also, when included, the reinforcing flange of the boss portion is integrally formed therewith when the press forming technique is carried out so that the same function and result are obtained in this case as in the above first to fifth embodiments.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A pulley comprising:
   a tubular boss portion;
   a disk shaped body portion which concentrically extends from said boss portion at one end thereof;
   a cylindrical belt mounting portion connected at a circumferential part of said disk shaped body portion and overlying said boss portion concentrically;
   at least said boss portion and said disk shaped body portion being integral and being made of a press formed metal plate; and
   a reinforcing flange integral with said boss portion at an end thereof opposite said one end and being made of said metal plate.

2. A pulley as set forth in claim 1, wherein said belt mounting portion is integral with said disk shaped body portion and made of said press formed metal plate.

3. A pulley as set forth in claim 2, wherein said body portion extends perpendicularly from said one end of said boss portion, and said belt mounting portion extends perpendicularly from a circumferential edge of said body portion.

4. A pulley as set forth in claim 1, wherein said boss portion has a large diameter part adjacent said one end and a small diameter part adjacent said opposite end, and said reinforcing flange is located on said small diameter part adjacent said opposite end, and said body portion extends perpendicularly from said large diameter part adjacent said one end.

5. A pulley as set forth in claim 4, wherein a circumferential wall of said small diameter part of said boss portion has axially extending reinforcing ribs.

6. A pulley as set forth in claim 1, wherein said boss portion has a key member.

7. A pulley as set forth in claim 6, wherein said key member is a key groove which is formed on a circumferential wall of said boss portion and extends axially from said one end edge of said boss portion.

8. A pulley as set forth in claim 6, wherein said key member is a key part which is formed in a circumferential wall of said boss portion and bent to protrude inwardly.

9. A pulley as set forth in claim 8, wherein said key part is a tongue shaped piece of said circumferential wall resulting from a C-shaped cut of said wall.

10. A pulley as set forth in claim 8, wherein said key part has parallel side faces extending axially.

* * * * *